Jan. 6, 1970  L. D. GIGANTINO  3,488,006
HIGH PRESSURE NOZZLE
Filed Jan. 5, 1968

INVENTOR.
LEONARD D. GIGANTINO
BY
ATTORNEY

United States Patent Office 3,488,006
Patented Jan. 6, 1970

3,488,006
HIGH PRESSURE NOZZLE
Leonard D. Gigantino, Maplewood, N.J., assignor to Wm. Steinen Mfg. Co., Parsippany, N.J., a corporation of New Jersey
Filed Jan. 5, 1968, Ser. No. 695,947
Int. Cl. B05b 1/00; B60s 1/00
U.S. Cl. 239—599                 4 Claims

ABSTRACT OF THE DISCLOSURE

The present disclosure describes a high pressure nozzle for spraying water for washing and cleansing purposes at 500 to 1,000 pounds per square inch. The nozzle has an insert of especially hardened metal, such as carbide, which may be pressed into position and if need be replaced after wear. The body of the nozzle may be of brass, plastic, or various types of relatively low cost materials.

Description of the invention

The present invention relates to a high pressure nozzle particularly designed for washing of automobiles and for other purposes where elongated high pressure application of water or other cleansing liquid is desired and where either the object being washed is moved under the nozzle or the nozzle is moved over the object to be washed.

It is among the objects of the present invention to provide a special novel high pressure nozzle for applying a stream or pattern of water to an object to be cleansed, such as an automotive vehicle, which nozzle may be readily repaired or refurbished to restore its maximum efficiency.

Another object is to provide a high pressure nozzle for cleansing and washing purposes in which there will be a minimum of wear by reason of the construction of the orifice elements.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory according to one embodiment of the present invention to provide a nozzle body having a threaded inlet end, desirably with a pipe thread and a flattened outlet face with a beveled or conical recess which will permit ready mounting of a control nozzle orifice tip.

This control nozzle orifice tip may be of hardened metal such as a carbide of tungsten or a hardenable grade of stainless steel or even a non-metallic material, which has a cylindrical exterior side adapted to be press fitted into an opening into the relatively soft outside body and which will when fully assembled, be flush on its outer face with the flat outlet side of the nozzle and on its inside face will have a conical recess opening into a relatively wide chamber. The nozzle element itself, in addition to the conical entrance, will have a main through passage of cylindrical shape which will terminate in the bottom of a transverse groove, forming an elongated orifice upon the cylindrical bottom of the nozzle.

An important feature of the present invention resides in the fact that around the outlet end of the metal tip carrying the orifice is a conical recess which extends around both ends of the through transverse groove in the tip.

Brief description of drawings

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be restored to which fall within the scope of the claims hereunto appended.

Referring to FIGS. 1 and 2, there is shown a nozzle A which is mounted to receive water or other liquid under pressure from a conduit B. The conduit B has an opening C around which is mounted the threaded adapter D. The nozzle itself is formed of the body E and the hard metal tip F.

Figure 1:
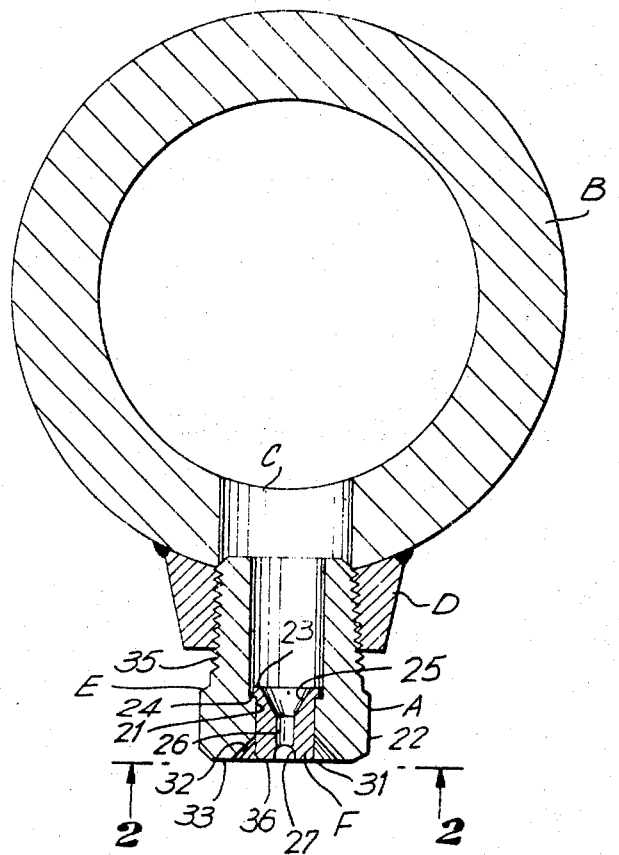
FIG. 1 is a transverse sectional view showing the nozzle mounted in a supply conduit.
Figure 2:
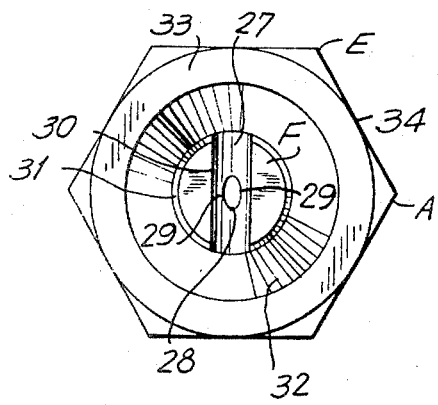
FIG. 2 is a bottom plan view upon the line 2—2 of FIG. 1.

Referring specifically to the hard metal tip F, it is provided with a cylindrical side which is press fitted in the recess 21 in the outlet end 22 of the nozzle A. The face of the tip F will have an outstanding portion 23, which will be stopped against the shoulder 24. The tip has an inlet converging conical passageway 25, a through axial passageway 26, which opens into transverse cylindrical groove 27.

The opening will form the orifice 28, which is elliptical, and the sides 29 of which are spaced from the sides 30 of the groove or cylindrical recess 27. The tip is provided with a bevel 31, which is encircled by the conical well 32 in the top face 33 of the nozzle body E. The nozzle body E has a hexagon portion 34 and it has a conical pipe threaded inlet end 35. The face 36 of the hard metal tip F should be flush with the top face 33 of the body A. The face 36 should be flush or below the face 33 so that the insert F cannot be accidentally pushed out or damaged in service. In usage the fact that the faces 33 and 36 are in the same plane as the recess or well 32 will result in a better spray pattern. The bevel 32 is used to provide air circulation, permitting the water stream to leave the nozzle cleanly without dribbling.

It is quite convenient to achieve pressure to 500 to 1,000 pounds per square inch and particularly of about 700 pounds per square inch. The tip F will be very resistant to wear and may consist of hardened stainless steel or carbide, and if it is necessary to replace it, such may be readily done and a new tip inserted.

The body A may be of brass of aluminum, or even of wear resistant plastic, since the maximum wear and tear occurs in the passageway through the hardened metal tip F. The champfer or well will assure a proper pattern for the spray without deformation. The opening 24 is desirably reamed to closely receive the press fit. The spray avoids dribbling and gives a clean break with a minimum of voids.

As many changes could be made in the above high pressure nozzle, and many widely different embodiments of this invention could be made without departure from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A high pressure washing nozzle, comprising a body having an exteriorly threaded inlet end and a central inlet chamber and a reduced diameter cylindrical outlet passageway and a hard material insert in said passageway, said insert and body having flush outlet faces and said body having a champfer well around the outlet face of the insert, said insert having a conical converging inlet passageway from the inlet chamber, a central axial passageway and a transverse semicylindrical groove across its outlet face, said passageway terminating in the bottom of the semicylindrical groove, the inner intersection of the axial passageway and the groove forming an elliptical orifice.

2. The nozzle of claim 1, said orifice having its side and end edges terminating below the side edges of the groove and in the lower part thereof, said insert being of carbide.

3. The nozzle of claim 1, said insert being of hard stainless steel.

4. The nozzle of claim 1, said reduced diameter outlet passageway having an inlet shoulder and said insert having an inlet flange to contact said shoulder.

References Cited

UNITED STATES PATENTS

| 1,617,673 | 2/1927 | Dezurik | 239—597 |
| 1,630,974 | 5/1927 | Shelor et al. | 239—597 X |
| 2,953,248 | 9/1960 | Troland | 239—602 X |
| 3,073,529 | 1/1963 | Baker | 239—597 X |
| 3,101,906 | 8/1963 | Webber | 239—601 X |

ROBERT B. REEVES, Primary Examiner

NORMAN L. STACK, Jr., Assistant Examiner

U.S. Cl. X.R.

239—601, 602